United States Patent [19]

White et al.

[11] Patent Number: 4,959,181

[45] Date of Patent: Sep. 25, 1990

[54] ION EXCHANGE USING HYDROUS URANIUM DIOXIDE

[75] Inventors: David A. White; Paul Donson, both of London, United Kingdom

[73] Assignee: British Nuclear Fuels PLC, Warrington, United Kingdom

[21] Appl. No.: 326,487

[22] Filed: Mar. 20, 1989

Related U.S. Application Data

[62] Division of Ser. No. 112,458, Oct. 26, 1987, abandoned.

[30] Foreign Application Priority Data

Oct. 27, 1986 [GB] United Kingdom ................ 8625657

[51] Int. Cl.$^5$ .......................... C01G 43/01; C02F 1/42
[52] U.S. Cl. .................................. 252/625; 210/682; 210/688; 252/184; 423/2; 423/6
[58] Field of Search ................ 252/184, 625; 423/36; 210/682, 688

[56] References Cited

U.S. PATENT DOCUMENTS

| | | |
|---|---|---|
| 2,859,093 | 11/1958 | Russell et al. |
| 3,189,555 | 6/1965 | Smith et al. ........................ 252/625 |
| 3,312,629 | 4/1967 | Smith ................................ 252/625 |
| 3,312,633 | 4/1967 | Smith ................................ 252/625 |
| 3,338,034 | 8/1967 | Hemestreet . |
| 3,367,881 | 2/1968 | Morse .............................. 252/301.1 |
| 3,522,187 | 7/1970 | Kraus ................................ 252/184 |
| 3,758,670 | 9/1973 | McBride et al. .................... 423/261 |
| 4,056,112 | 11/1977 | Calmon .............................. 134/6 |
| 4,178,270 | 12/1979 | Fujita et al. ...................... 252/184 |
| 4,591,455 | 5/1986 | Macedo et al. .................... 252/629 |
| 4,717,513 | 1/1988 | Lewis et al. ....................... 556/9 |

FOREIGN PATENT DOCUMENTS

| | | |
|---|---|---|
| WO84/02089 | 7/1984 | PCT Int'l Appl. . |
| 963352 | 7/1964 | United Kingdom . |
| 978615 | 12/1964 | United Kingdom . |
| 1020287 | 2/1966 | United Kingdom . |
| 1120208 | 9/1968 | United Kingdom . |
| 1536335 | 12/1978 | United Kingdom . |

OTHER PUBLICATIONS

Kraus et al., "Ion Exchange Properties of Hydrous Oxides", *Proceding of the 2nd U.N. Intl. Conf., Peaceful Uses of Atomic Energy*, vol. 28, pp. 3–16, Genava (1958).

Amphlett et al., *J. Inorg. Nucl. Chem.*, 1958, 6, 236–245.

Amphlett, "Inorganic Ion Exchangers", pp. 84–92, Elsevier Publ. Co. (1964), New York.

Gmelin Handbuch Der Anorganischen Chemie, 8th ed., "Uran," vol. C2, 1978, pp. 252–259, Springer-Verlag, Berlin, DE.

*Primary Examiner*—Edward A. Miller
*Attorney, Agent, or Firm*—Larson and Taylor

[57] ABSTRACT

Ion exchange performed by contacting a solution containing ions to be absorbed with a hydrous oxide of uranium in a suitable form. The hydrous oxide may be uranium dioxide or uranium hydroxide, and may be prepared by reducing a uranium species, precipitating the reduced species, and drying the precipitate to give the required hydrous oxide.

3 Claims, No Drawings

ION EXCHANGE USING HYDROUS URANIUM DIOXIDE

This application is a division, of application Ser. No. 07/112,458 filed Oct. 26, 1987 now abandoned.

This invention relates to ion exchange materials and is particularly, but not exclusively, concerned with ion exchange materials for use with radioactive nuclei.

Ion exchange materials are used in many industries to remove ions from solutions. For example, in the nuclear industry ion exchange materials are employed to remove radioactive ions from waste streams, thereby allowing the waste streams to be safely disposed of. In addition, by removing the radioactive ions from the waste streams and incorporating the radioactive ions into the ion exchange material the volume of radioactive material requiring storing is reduced.

According to a first aspect of the present invention there is provided an ion exchange material consisting of or comprising a hydrous oxide of uranium in a form suitable for ion exchange.

According to a second aspect of the present invention there is provided a method of carrying out ion exchange on a solution, said method comprising contacting the solution with an ion exchange material consisting of or comprising a hydrous oxide of uranium which is in a form suitable for ion exchange.

According to another aspect of the present invention there is provided a method of manufacturing an ion exchange material consisting of or comprising a hydrous oxide of uranium said method including reducing a compound of uranium to a reduced uranium species, precipitating the reduced uranium species and drying the precipitate to give said oxide of uranium in a form suitable for carrying out ion exchange.

As used herein, the term hydrous oxide of uranium inludes uranium hydroxides.

The compound of uranium may comprise a uranyl salt.

Preferably, the ion exchange material consists of or comprises hydrous uranium dioxide.

The ion exchange material may be used to remove radioactive species, such as caesium ions, plutonium ions, strontium ions, or americium ions, from a solution.

The reduction of the uranyl salt may be carried out with an amalgam comprising zinc and mercury, or an amalgam comprising uranium and mercury. Alternatively the reduction may be carried out using sodium dithionite, vanadous ions or an electrolytic cell. The reduced species produced may comprise a uranium (IV) species or a uranium (IV) species and a uranium (III) species When the ion exchange material comprises uranium dioxide, if uranium (III) species is produced on reduction of the uranyl salt the uranium (III) may aid the reduction of further uranyl salt, and any uranium (III) remaining at the end of the preparation may be allowed to oxidise to uranium dioxide in the drying stage.

Precipitation of the reduced uranium species may be accomplished by the addition of hydroxyl ions, which may be added in the form of an alkali metal hydroxide such as sodium hydroxide, or a nitrogen-based base such as ammonia, hydroxylamine, or hydrazine.

The reduced uranium species may be precipitated as a colloidal suspension which yields a gel. On drying the particles may link together to form the ion exchange material.

Desirably, the precipitate is washed before being dried to remove any by-products or impurities e.g. the reagent used to precipitate the reduced species. The conductivity of the washings may be monitored during the washing procedure so as to indicate when the impurities or by-products being washed out of the ion exchange material, and hence those remaining in the ion exchange material, are at an acceptable level. This level may be achieved when the washings have conductivity values below 1000 $\mu$s.

Alternatively, the reduced uranium species may be precipitated as a salt such as a phosphate. In the case where the oxide of uranium is uranium dioxide the uranyl salt is reduced to a uranium (iv) species, the uranium (iv) species precipitated as a uranium (iv) salt, such as uranium (iv) hydroxide or uranium (iv) phosphate and the precipitated salt dried to give the ion exchange material.

The oxide of uranium may also be prepared by oxidation of a uranium salt or uranium metal, using for example chlorosulphonic acid.

It should be understood that ion exchange includes a process in which ions are removed from a solution by being absorbed or adsorbed by the ion exchange material The invention will now be further described, way of example only, with reference to the following examples.

A solution of uranyl nitrate (0.1M) is brought into contact with an equal volume of Jones reductor—a reducing agent prepared from granulated zinc and mercuric chloride. The yellow uranyl nitrate solution turns green on contact with the Jones reductor, and after a few minutes the solution is decanted and a solution containing excess sodium hydroxide added to the decanted solution. A dark green precipitate of uranium (iv) hydroxide is produced. The precipitate is filtered, washed with water and dried overnight at 110° C. under nitrogen to give a black solid comprising hydrated uranium dioxide having loosely bound hydroxyl groups.

If incomplete reduction has occurred which is usually indicated by the material having a green coloration, the reduction step can be repeated.

The conductivity of the washings are monitored and the washing continued until the conductivity of the washings are below 1000 $\mu$S. However, the number of washes can be reduced to increase the amount of salts of oxide of uranium present in the ion exchange material obtained.

Other reducing agents, such as sodium dithionite, can be used instead of the Jones reductor. For example, in one preparation uranyl nitrate hexahydrate (250 g) was dissolved in distilled water (400 cm$^3$) and sodium dithionite (550 cm$^3$ of a 0.8M solution) added. The precipitate present in the uranium (IV) solution was dissolved by addition of concentrated nirric acid (50 cm$^3$) and the solution filtered. The solution was then diluted with distilled water to 1 liter and contacted with sodium hydroxide (1000 cm$^3$ of a 2.8M solution) to give a precipitate which was collected by centrifuging the mixture. Washing was carried out until the conductivity of the water was below 1000$\mu$ Siemens. The final precipitate was dried overnight at 110° C. under an atmosphere of nitrogen to give the ion exchange material (137.2 g).

Other reagents such as ammonia can be used in the precipitation step. The uranium dioxide is precipitated as a colloidal suspension which gives a gel and which is dried to give the ion exchange material.

It has been found that the proportion of uranium (III) obtained on reduction of the uranyl salt is increased as the amount of nitrate present is reduced. Therefore, as uranium (III) can aid the reduction of uranyl to uranium (IV), when it is desired that the ion exchange material comprises uranium (IV) (e.g. uranium dioxide) it is advantageous to carry out the reduction in the absence of nitrate.

When the black solid is contacted with a solution containing ions of higher actinides, thorium or strontium the solid acts as an ion exchange material by absorbing the ions.

The ability of uranium dioxide to remove ions from solutions is illustrated in the following table which gives a comparison of the distribution coefficients of uranium dioxide with zirconium dioxide and manganese dioxide for americium-241, plutonium-242, caesium-134 and strontium-85, in nitrate solution.

| MATERIAL | pH | DISTRIBUTION COEFFICIENTS | | | |
|---|---|---|---|---|---|
| | | Am-241 | Pu-242 | Cs-134 | Sr-85 |
| URANIUM DIOXIDE | 4.1 | $1.4 \times 10^3$ | $5.0 \times 10^3$ | 31 | 7 |
| MANGANESE DIOXIDE | 3.2 | $1.1 \times 10^3$ | $3.3 \times 10^3$ | 32 | 6 |
| URANIUM DIOXIDE | 6.1 | $2.7 \times 10^3$ | $2.3 \times 10^3$ | 11 | 72 |
| ZIRCONIUM DIOXIDE | 6.6 | $2.4 \times 10^3$ | $2.9 \times 10^3$ | 0 | 0 |

Tests on a further batch of hydrous uranium dioxide gave the distribution coefficients set out in the following table for Am-241, Pu-242, Sr-85, Cs-134 in nitrate solution at various pH's.

| FINAL SOL. pH | DISTRIBUTION COEFFICIENTS | | | |
|---|---|---|---|---|
| | Am-241 | Pu-242 | Sr-85 | Cs-134 |
| 4.2 | $2.5 \times 10^3$ | $9.9 \times 10^3$ | 16 | 230 |
| 4.9 | $1.2 \times 10^3$ | $7.4 \times 10^3$ | 63 | 322 |
| 7.6 | $\infty$ | $6 \times 10^4$ | $3.7 \times 10^3$ | 279 |
| 8.2 | 900 | $5.3 \times 10^3$ | $1.9 \times 10^3$ | $1.4 \times 10^3$ |
| 9.9 | 36 | 39 | 718 | $1.2 \times 10^3$ |
| 10.4 | 74 | 79 | 702 | $1.1 \times 10^3$ |
| 11.1 | 177 | 198 | 592 | 160 |

Column tests were also carried out to determine the capacity of the hydrous uranium dioxide ion exchange material. The capacity of the material for Cs-137, Sr-90 and Eu-154 is given in the following table.

| Element | Capacities | | Max. Activity Sorbed |
|---|---|---|---|
| | g/liter | mol/liter | Ci/liter |
| Caesium | 134 | 1.00 | 5600 |
| Strontium | 65 | 0.72 | 2900 |
| *Europium | 53 | 0.34 | 2200 |

*Simulant for Americium

It appears that the hydrous uranium dioxide ion exchange material is predominantly a cation exchanger, and that although it exhibits some anion exchange behaviour, e.g. exchange of chloride, this behaviour is poor. Also it has been found that there is a good correlation between caesium uptake and concentration, and that the uptake of $Cs^+$ is still relatively high at pH's less than 5 which is somewhat surprising as one would expect that at low pH's, where the hydrous uranium dioxide is being dissolved, the ion exchange abilities of the hydroxyl groups to be severely diminished. It is believed that at least part of the ion exchange material is present in the form of a hydrous uranite salt, such as a sodium uranite or ammonium uranite salt. Thus exchange of $Cs^+$ for the $Na^+$ or $NH_4^+$ can take place.

In the case where the uranium dioxide ion exchange material is used to absorb radioactive ions, the spent ion exchange material may be stored to allow the radioactivity to decay, or disposed of in the same way as the spent uranium dioxide fuel pellet, that is the spent ion exchange material may be reprocessed along with spent nuclear fuel. In this way any ions absorbed by the ion exchange material may be recovered. Although any isotope of uranium may be used in the ion exchange material, it is preferable that in the case where the spent ion exchange material is to be reprocessed along with spent uranium dioxide fuel that the isotopic composition (that is the ratio of U-235 to U-238) is comparable to that of the spent nuclear fuel.

The ion exchange material can be supported on an inert carrier, such as silica, carbon, ceramic chips or beads of synthetic polymers. Preparation of these forms of ion exchange materials can be carried out by soaking the inert carrier in a solution containing a uranium (iv) species, placing the impregnated carriers in an alkali such as sodium hydroxide for a few hours and then drying the impregnated carrier under nitrogen. Alternatively, the inert carrier can be in the form of a porous plate or tube so that an ion exchange membrane is formed. In this case a uranium (iv) solution is placed on one side of the plate (or tube) and a sodium hydroxide solution placed on the other side of the plate (or tube), so that uranium hydroxide is precipitated in the plate (or tube). The plate (or tube) is then dried to give an ion exchange material supported on an inert carrier.

It should be appreciated that the ion exchange materials are not limited to use in the nuclear industry.

The ion exchange material might consist of or comprise an oxygen-containing compound of uranium such as a uranite salt. For example, the ion exchange material might comprise a hydrous uranite salt such as sodium uranite alone or in combination with a hydrous oxide of uranium such as uranium dioxide.

We claim:

1. A method of carrying out ion exchange on a solution, comprising contacting the solution with an ion-exchange material consisting essentially of solid hydrous uranium dioxide which is in a form suitable for carrying out ion exchange.

2. A method as claimed in claim 1, in which the solution includes at least one element from the group consisting of caesium, plutonium, strontium and americium.

3. A method according to claim 1 wherein said ion exchange material is made by a process which comprises reducing a compound of uranium to give a reduced uranium species, precipitating the reduced uranium species, and drying the precipitate to give said ion exchange material consisting essentially of a solid hydrous uranium dioxide which is in a form suitable for ion exchange.

* * * * *